US007707809B1

(12) United States Patent
Terwilliger

(10) Patent No.: US 7,707,809 B1
(45) Date of Patent: May 4, 2010

(54) CHOKE PREVENTION ATTACHMENT FOR A RUNNING HORSE

(76) Inventor: Al G. Terwilliger, 22722 Dequindre Rd., Warren, MI (US) 48091-2203

( * ) Notice: Subject to any disclaimer, the term of this patent is extended or adjusted under 35 U.S.C. 154(b) by 0 days.

(21) Appl. No.: 12/317,289

(22) Filed: Dec. 23, 2008

(51) Int. Cl.
*B68B 1/00* (2006.01)
*A01K 15/04* (2006.01)

(52) U.S. Cl. .......................................... 54/57; 119/815

(58) Field of Classification Search ..................... 54/57, 54/67; 119/815, 821, 855; 602/18; *B68B 1/00; A01K 15/04, 15/00, 29/00*
See application file for complete search history.

(56) References Cited

U.S. PATENT DOCUMENTS

| | | | | | |
|---|---|---|---|---|---|
| 78,155 | A | * | 5/1868 | Sullivan | 119/829 |
| 195,667 | A | * | 9/1877 | Snead et al. | 119/821 |
| 258,318 | A | * | 5/1882 | Rothschild | 54/57 |
| 378,970 | A | * | 3/1888 | Morrissey | 54/57 |
| 420,054 | A | * | 1/1890 | Gowan | 119/821 |
| 444,677 | A | * | 1/1891 | Taylor | 54/57 |
| 596,529 | A | * | 1/1898 | McCormac | 54/57 |
| 865,308 | A | * | 9/1907 | Knight et al. | 54/6.1 |
| 1,012,763 | A | * | 12/1911 | Van Keuren | 54/67 |
| 1,113,840 | A | * | 10/1914 | Schurr | 54/67 |
| 1,456,706 | A | * | 5/1923 | Murray | 119/855 |
| 1,686,060 | A | * | 10/1928 | Achenbach | 54/57 |
| 1,715,432 | A | * | 6/1929 | Smith | 54/67 |
| 2,313,833 | A | * | 3/1943 | Marmet | 119/815 |
| 2,669,816 | A | * | 2/1954 | Pletsch | 54/6.1 |
| 2,816,525 | A | * | 12/1957 | Hoagland | 119/815 |
| 2,941,507 | A | * | 6/1960 | Becker et al. | 119/815 |
| 3,024,767 | A | * | 3/1962 | Des Roches | 119/821 |
| 4,286,547 | A | * | 9/1981 | Nuwbauer et al. | 119/815 |
| 4,345,548 | A | * | 8/1982 | Krebs et al. | 119/855 |
| 4,385,592 | A | * | 5/1983 | Goldstein | 602/18 |
| 4,745,922 | A | * | 5/1988 | Taylor | 607/104 |
| 5,460,125 | A | * | 10/1995 | Lookingbill | 119/821 |
| 7,036,460 | B2 | * | 5/2006 | Ducharme et al. | 119/828 |
| 2007/0156072 | A1 | * | 7/2007 | Leatt | 602/18 |
| 2009/0306563 | A1 | * | 12/2009 | Ben-Kiki | 602/18 |

* cited by examiner

*Primary Examiner*—Son T. Nguyen
(74) *Attorney, Agent, or Firm*—Bernard J. Cantor

(57) ABSTRACT

An anti-choke attachment for a horse for preventing internal blockage of the horse's nasopharynx or other blockage of the horse's breathing when the horse is running or vigorously exercising. The attachment temporarily locks the horse's head against tilting downwardly or swinging sidewise. The attachment comprises a rigid plate having a lower part shaped to fit against a horse's neck and an upper part shaped to fit beneath the rear portion of the horse's jaw. An elongated, relatively thick, resilient pad arranged on the upper part is arranged to fit closely within the intermandibulary space region along the rear of the horse's head so as to prevent downward tilting and sidewise swinging of the head relative to the neck which both prevents partial blockage of the nasopharynx and helps maintain driver control of the horse.

8 Claims, 5 Drawing Sheets

FIG 1
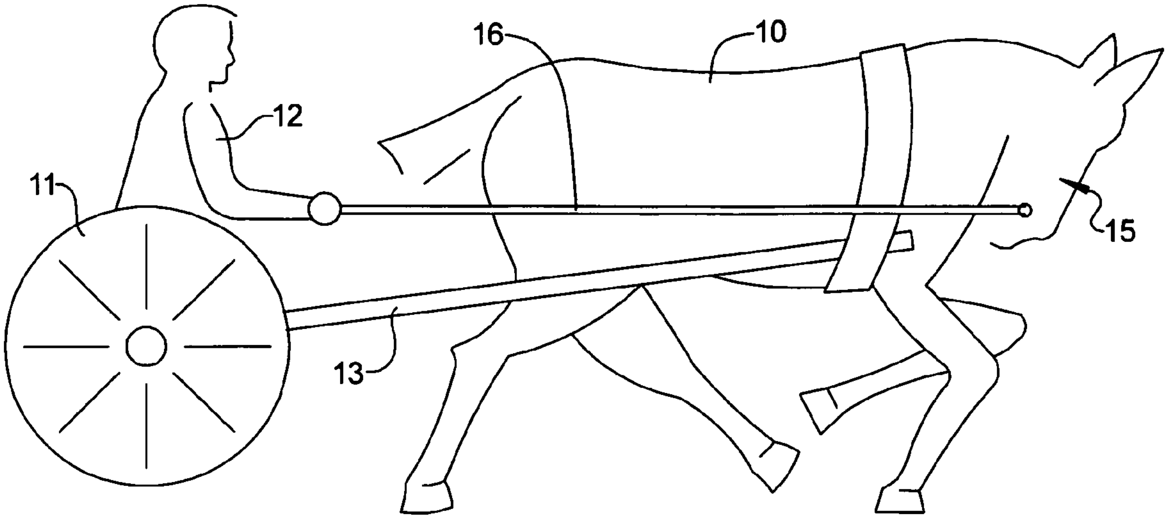
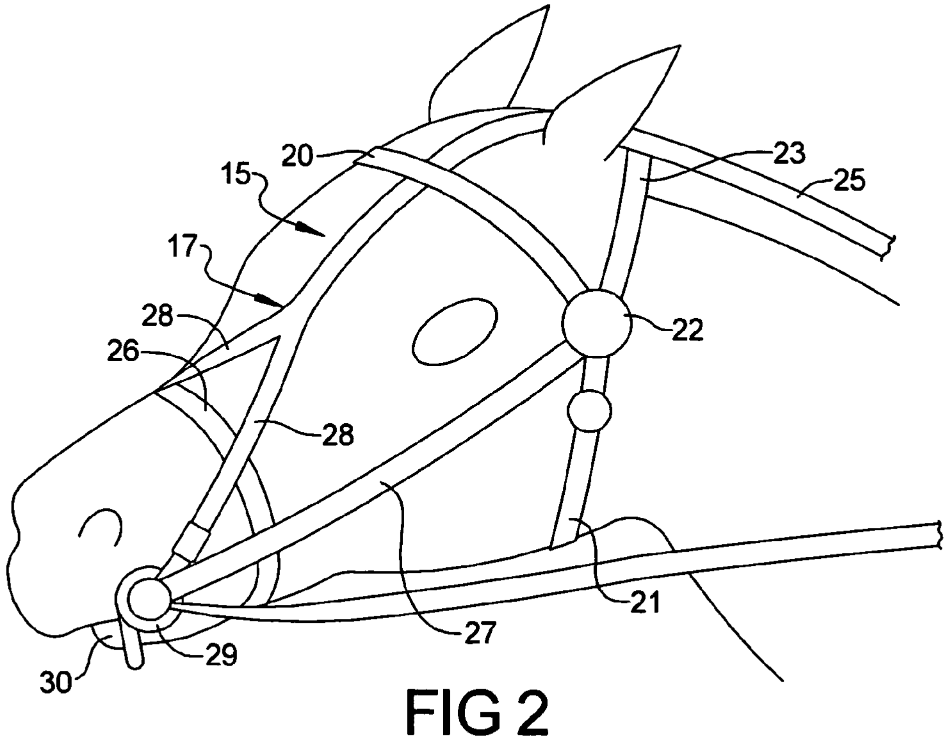
FIG 2

FIG 9
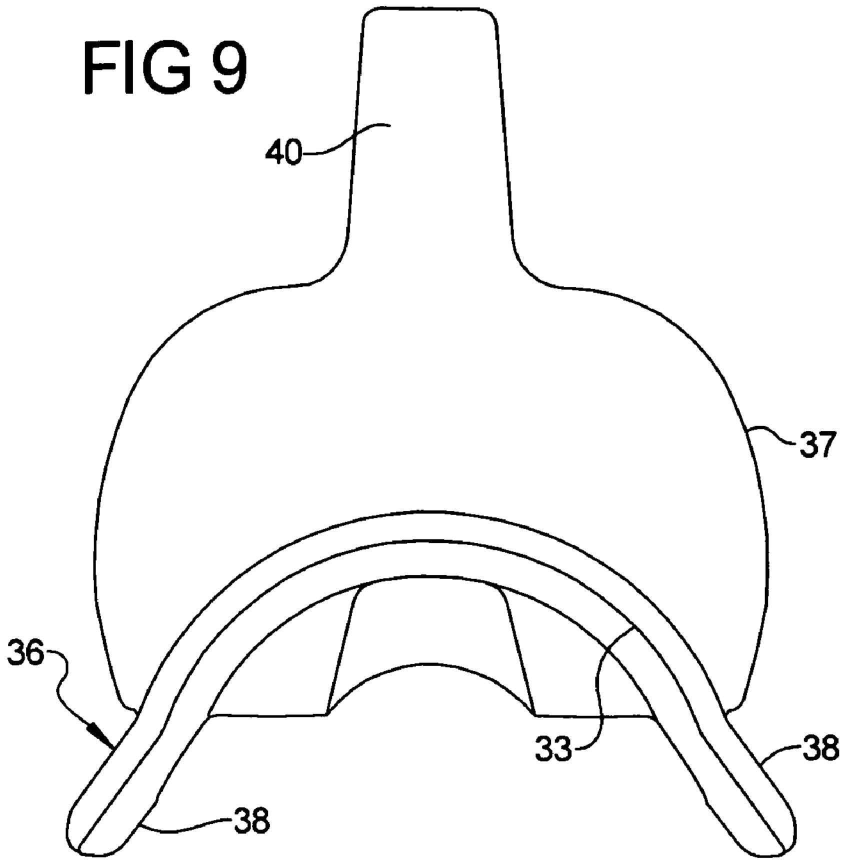
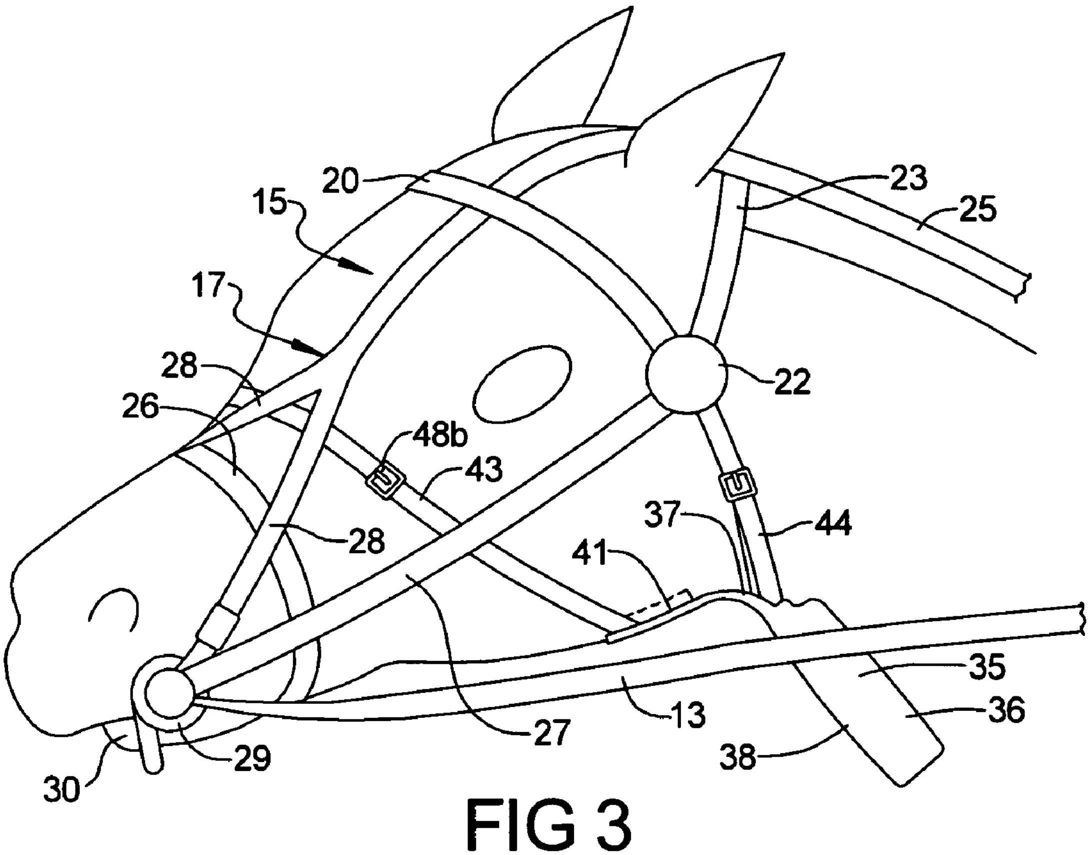
FIG 3

CHOKE PREVENTION ATTACHMENT FOR A RUNNING HORSE

BACKGROUND OF INVENTION

This invention relates to a temporary attachment for securing upon a horse in order to prevent the horse from choking while breathing heavily during the time that the horse is running or otherwise vigorously exercising. The attachment is particularly useful for race horses engaged in trotting or pacing or the like races during which the horse pulls a cart or similar vehicle upon which a driver is seated for directing the horse.

During a race or other similar running activities, during which the horse is breathing heavily, there is a tendency for the dorsal region of the horse's tongue to partially block the nasopharynx opening in the breathing passageway of the horse. That reduces the horse's intake of air and consequently causes a horse to choke or to reduce the horse's ability to run at maximum speed. Similarly, it is believed that internal tissues in the nasopharynx region of the horse also may partially block the flow of air. Such blockage particularly occurs when the horse tilts its head downwardly against or towards its neck, and, sometimes, when the horse swings its head from side-to-side. The partial or substantial blockage of the horse's airflow during heavy breathing is reduced or completely avoided when the horse keeps its head upright and straight.

The term "running" as used here, is intended generally to include the various forms of running such as trotting, pacing, or other such rapid movements common in racing or in exercising that cause heavy breathing.

In addition, during "running" as generically used here, there is a tendency for the driver of the horse, who may be seated upon a cart or sulky pulled by the horse, to steer or direct the horse by pulling rearwardly on the reins. The reins are attached to the bit in the horse's mouth so that this causes the horse to lower its head in order to reduce the pressure against its mouth, or to turn its head in a sidewise direction in response to the tug of one rein. That action causes blockage of the airflow, and consequently exacerbates the choking.

Previously, attempts have been made to provide devices for keeping the horse's head up during exercising or running and devices, such as conventional "poles" attached to the horse's head to keep the horse running with its head straightforward. Also, an attempt had been made to deal with the problem of dysfunction of a horse's air passageway including blockage of the passageway during running. An example of this is described in U.S. Pat. No. 7,036,460-B2, issued May 2, 2006 to Norm G. Ducharme, Richard P. Hackett and J. Brett Woodie for a "Throat Support Device and Methods of Using Same."

That patent appears to be descriptive of the known "Cornell Collar" which is a device that is commercially available. In essence, the device is positioned against the lower portion of the horse's throat and is forced upwardly against the horse's throat so as to apply pressure upwardly against a particular point, or possibly several discrete points, in the structure around the air passageway at the rear of the horse's head. Its purpose, as indicated in the patent description, is to prevent blockage of a horse's air passageway which may be caused by problems due to the locations or mislocations of certain portions of the area surrounding the passageway in the throat. That could include blockage by the horse's tongue during running or exercise and even when the horse is still. The device apparently requires careful application upon the horse in order to locate specific locations against which the pressure is to be applied and to maintain that pressure while the device is on the horse.

Hence, it would be desirable to provide a simple device which eliminates the choking or air passageway blockage and can be easily attached and held, temporarily, on the horse, while the horse is running.

Further, during a running-type activity, when the horse tilts its head downwardly relative to its neck, the bit may become looser in its mouth instead of snuggly contacting against the corners of its mouth. Consequently, the horse may be able to grip the loose bit between its teeth. If that occurs the driver can lose control of the horse.

Consequently, it is desirable during activities which involve heavy breathing, to lock or fix the horse's head in an upper forwardly extending position, and preventing swinging side-to-side, without causing discomfort to the horse. The present invention is concerned with a temporary attachment which may be quickly and easily fastened upon, or removed from, the horse, without disturbing or removing its usual, conventional, bridle or reins, or the connection between the cart and the horse, and which painlessly prevents the horse from tilting its head downwardly or pivoting its head sideways during heavy breathing activities.

SUMMARY OF INVENTION

The anti-choke attachment is formed of a thin, roughly flat, rigid plate that is bent into a lower part for engagement against the horse's neck and an upper part that is arranged at an obtuse angle to the lower part for engagement against the horse's jaw. Thus, the attachment prevents the horse from lowering its head by tilting it down towards its neck.

The upper part of the attachment extends forwardly generally under the horse's throat at the bottom and rear of the horse's head. A thick, resilient or rubber-like, elongated, narrow pad is mounted upon the upper part for snuggly fitting into the space between the horse's jaw mandibles. That is, the horse's jaw bone mandibles are spaced apart so that there is a trough or channel beneath the horse's head between the jaw mandibles. The pad is shaped to fit into that space, depressing the skin and tissue upwardly between the mandibles so as to resiliently engage, in the opposing mandibles.

The attachment includes a strap which fastens the upper plate to the rear of the horse's head and another strap that fastens the plate at the middle of the horse's head. The lower part of the attachment engages against the horse's neck just below the head. The horse is prevented from tilting its head downwardly by the resilient pad which would exert an upward pressure to counteract any downward tilting. Swinging of the horse's head sideways or from side-to-side is prevented by the resilient pad fitting between the jaw mandibles.

The lower part of the attachment is bowed to provide space which permits expansion and contraction of the horse's throat or neck region. Ordinarily, when a horse is breathing heavily, its throat area in the upper portion of its neck tends to expand and contract during the heavy breathing. Thus, the center area of the lower part of the attachment is bowed or curved so that, when the horse is not breathing heavily the central area is spaced away from the neck while side flanges on the lower part engage the opposite sides of the horse's neck. During vigorous activity, when heavy breathing causes the horse's neck to expand forwardly, the neck can expand into the bowed portion of the attachment lower part. In this way, the attachment is generally comfortable to the horse particularly as the horse becomes accustomed to the restriction against tilting its head downwardly or from swinging its head sideways.

An object of this invention is to provide a temporary attachment that is easy to place upon or remove from the horse without disturbing the normal bridle straps, or bit and rein, which may be quickly removed. Thus, it may be used to keep the horse's air passageway unblocked when the horse is vigorously exercising and breathing heavily while running.

A further object of this invention is to provide an attachment for "locking" or holding the horse's head upright to prevent air passageway blockage and simultaneously prevents loosening of the straps that hold the bit in the corner of the horse's mouth. That prevents the bit from getting between the horse's teeth and the resulting loss of control by the driver Another object of this construction is that it keeps the dorsal surface area of the tongue and possibly other tissue in the dorsal area from blocking the nasopharynx area while the horse is running so as to prevent choking and to enable the horse to run faster.

The simple construction of the attachment is particularly advantageous in that it is inexpensive to construct and requires virtually no maintenance or special handling and it can be easily cleaned and kept readily available for use when desired These and other objects and advantages of this invention will become apparent upon reading the following description of which the attached drawings form a part.

DESCRIPTION OF DRAWINGS

FIG. 1 schematically illustrates a race horse pulling a cart upon which a driver is seated during a trotting or pacer race or exercise, FIG. 2 illustrates a typical bridle arrangement on a horse before the attachment is applied, FIG. 3 is a view similar to FIG. 2 but illustrating the attachment applied upon the horse which is wearing a typical bridle arrangement.

FIG. 9 is a bottom view, taken in the direction of arrows 9-9 of FIG. 7, of the attachment.

DESCRIPTION

Figure 4:
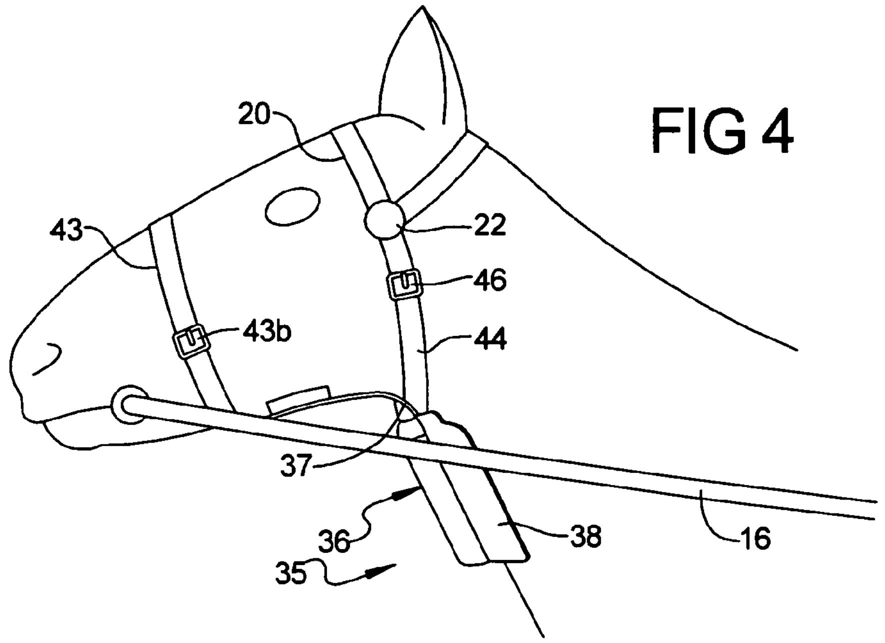
FIG. 4 is an elevational view of a horse's head and neck showing the attachment applied upon the horse with the bridle omitted from the illustration
Figure 5:
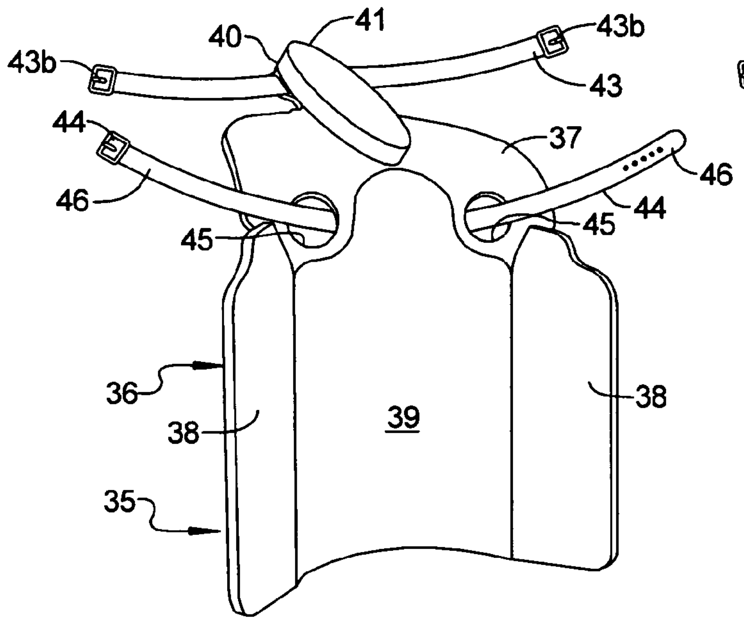
FIG. 5 is a rear elevational view of the attachment.
Figure 6:
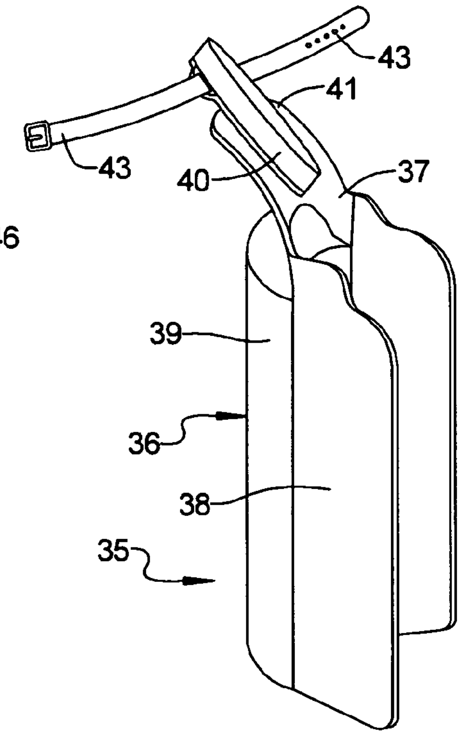
FIG. 6 is a side, elevational view of the attachment.
Figure 7:
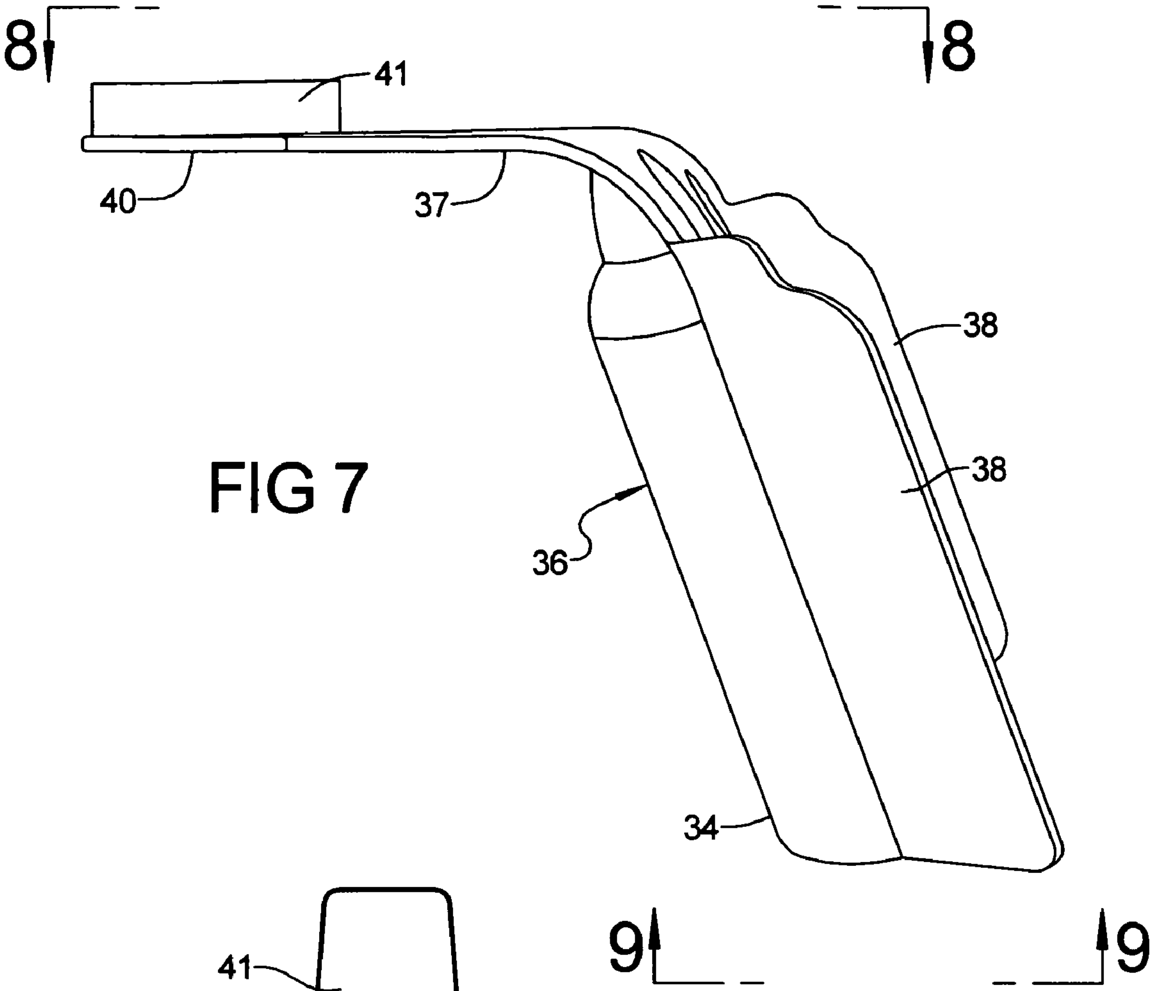
FIG. 7 is an enlarged side view of the attachmen
Figure 8:
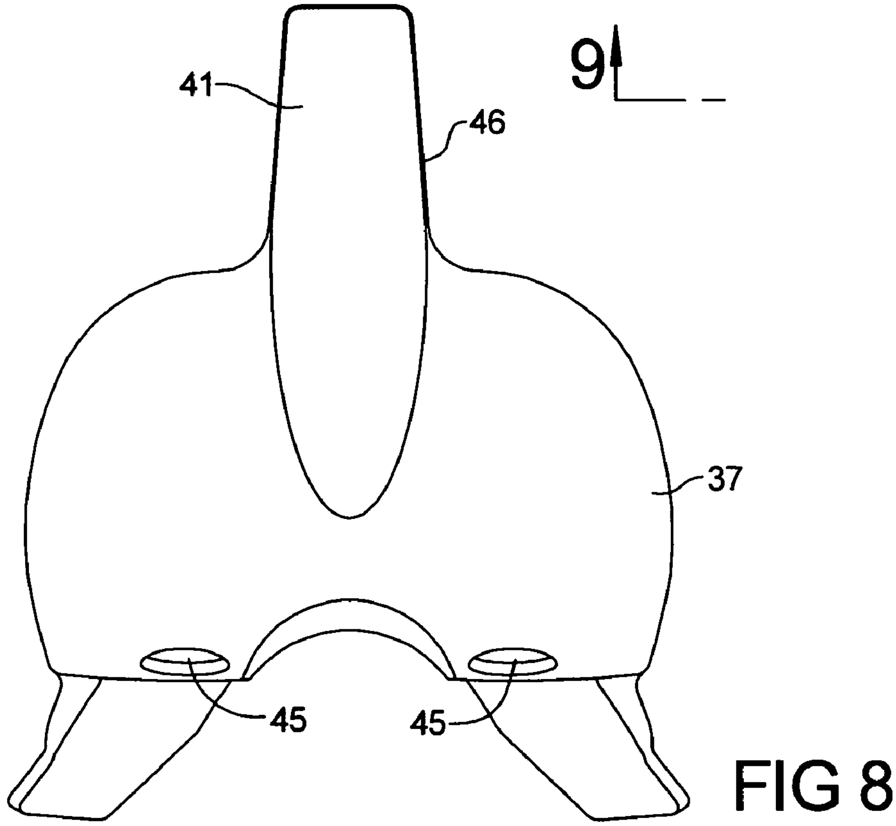
FIG. 8 is a top view, taken in the direction of arrows 8-8 of FIG. 7, of the attachment.
Figure 10:
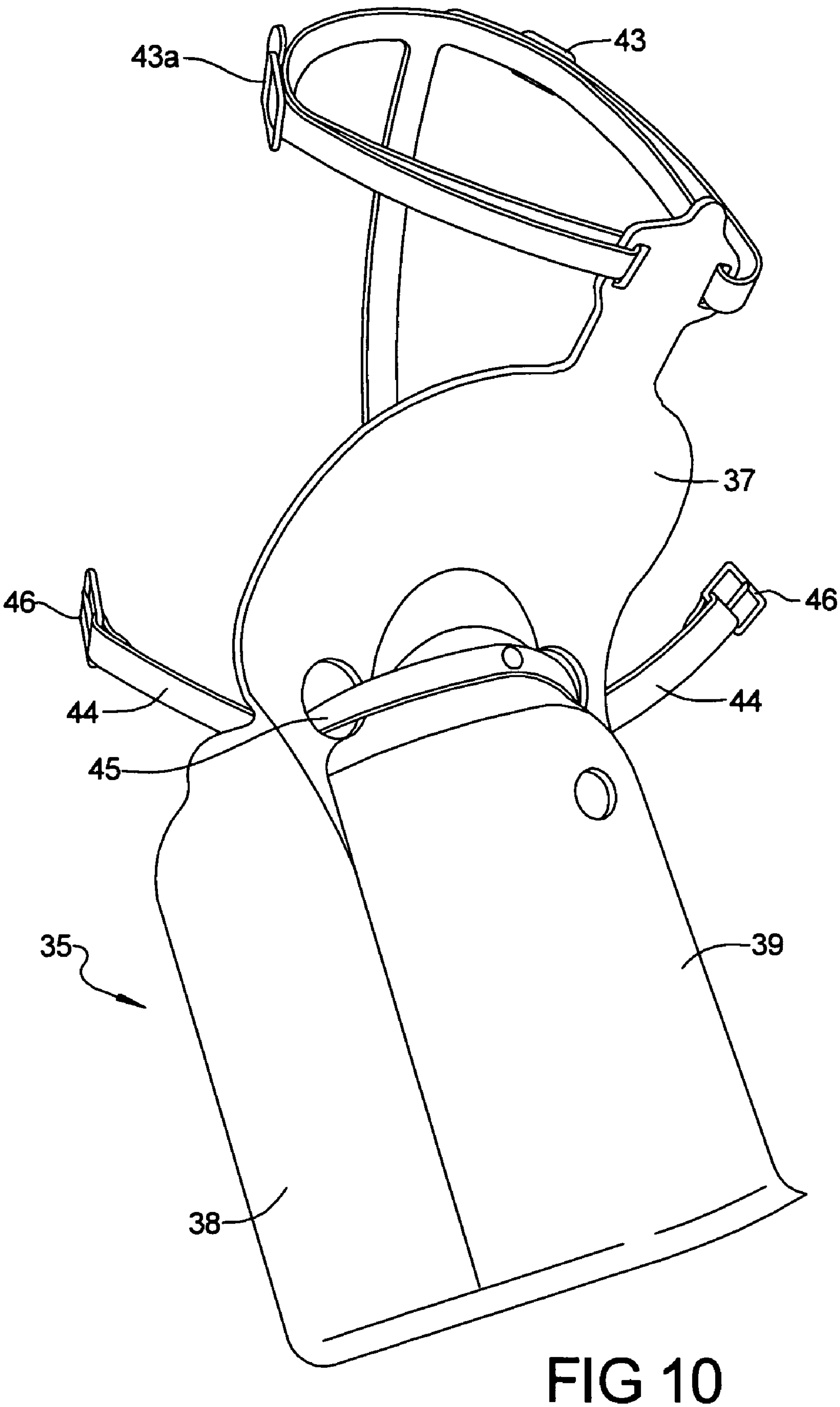
FIG. 10 illustrates a perspective front view of the attachment.

FIG. 1 schematically illustrates a horse 10 pulling a cart or similar vehicle 11 upon which the driver 12 is seated. The cart is connected by cart poles 15 to a harness 14 on the horse. The harness is schematically illustrated, with the details of a conventional harness omitted Reins 16 extend from the horse's head 15, or more specifically, from the bit in the horse's mouth, to the driver 12. The horse's head is shown in a tilted down position, that is, with the head pulled downwardly close to the neck of the horse. In that position, there is a tendency for blockage of the horse's breathing passageways, particularly at or around the nasopharynx. Hence, that head position is undesirable particularly during a race or other vigorous running.

The horse is provided with a conventional bridle arrangement, as illustrated in FIG. 2. The particular arrangement may be varied and is shown in the drawing for illustrative purposes. The bridle arrangement may be varied considerably and is not part of the invention herein.

The particular bridle arrangement 17, comprises a brow band 20 to which a throat latch 21 is connected by a conventional connector 22. An overhead strap 23 is attached to the same connector. Another strap 25 extends over the neck and head towards the nose. A nose band 26 encircles the head near to the nose. A bit adjustment buckle and strap 27 and the legs 28 of a driving snaffle 26 are connected to a bit rings 29. which are connected to the bit 30 that is positioned in the horse's mouth as illustrated in FIG. 2 of the drawings. The foregoing construction is conventional and intended to be illustrative of an example of various bridles and straps that are commonly used.

The attachment 35, as illustrated in FIGS. 3 and 4, is arranged against the upper portion of the horse's neck and the lower, rearward portion of the horse's head. This attachment is formed of a relatively, rigid plate which may be made of a suitable rigid plastic material of sufficient thickness so that the lower neck portion 36 of the plate and the upper head portion 37 of the plate are stiff and non-bendable relative to each other. The upper portion of the plate is arranged at an approximately obtuse angle relative to the lower portion as illustrated, for example in FIG. 4. The lower portion or part of the plate is formed with opposite side flanges 38 which are normally arranged on opposite sides of the horse's neck just below the junction of the head to the neck. Between the flanges the central part of the lower portion is bowed to form a forwardly bowed cavity area 39 which is shaped to receive the overlapped part of the horse's neck when the horse is breathing hard and the neck of the horse tends to expand forwardly. Thus, the bowed area of the plate normally would not tightly contact against the horse's neck but rather it would be spaced away from, and be available to receive, the expanding neck without constricting the expansion.

The upper, integral, portion of the attachment is formed with a forwardly extending tongue 40. A relatively thick, elongated, narrow, resilient pad 41 is secured upon the tongue such as by a suitable adhesive. The pad is formed of a sufficient width to fit generally snugly into the depression in the horse's throat area, that is, beneath the intermandibulary space at the rear of the horse's jaw. The pad generally extends from about the nasopharynx area to about half way to the forward end of the horse's head beneath the jaw. Preferably the pad is made of a sponge rubber-type material such as a foam plastic which is rubber-like in its resiliency, that is, compressible and resiliently returnable to its normal shape. The particular rubber-like material selected, preferably, should be a resilient \plastic material which would be suitable for the environment involved and would not tend to rot or fragment in normal use and storage. A number of suitable plastic materials or rubber-like plastic materials are available commercially.

In order to firmly secure the attachment to the horse, the ends of a nose band strap 43 extending through holes 43*a* formed in the upper plate part are joined together by a suitable buckle 43*b* to encircle the horse's head roughly in the area about midway between the front and rear of the head.

Similarly, a throat band or strap 44 extends through openings 45 in the upper part of the panel. The straps 44 may extend completely around the horse's head near the horse's ears and its ends may be connected together by a suitable buckle. However, it is preferred to connect the throat band 44 to the existing brow band 20 by removing the throat latch 22 and replacing it with the strap 44, utilizing the buckles 46. Thus, the throat connecting strap when ne connected to the bridle brow band, ensures that the attachment is properly positioned and firmly fastened in place.

. Preferably, the lower portion of the attachment simply rests against the opposite sides of the horse's neck or throat area which is engaged between the flanges.

Summarizing, the attachment is primarily intended for applying upon a horse before the horse engages in vigorous exercise which involves heavy breathing, such as the various running forms of a trotter or pacer or other racing horse. With the attachment in place, the horse's head is kept and in an upward, forwardly aligned position, where it is "locked" in place. Hence, if the driver pulls on the rein sufficiently hard, to cause the horse to tilt his head downwardly towards his neck, that tilt is prevented by the attachment. The t, the resilient pad and upper portion of the attachment, are relatively comfortable for the horse and do not hurt it. Similarly, if the horse voluntarily swings its head back and forth or its head is pulled to one side or the other by the driver's force on one the rein, the horse is prevented from swinging his head by the engagement of the pad within the channel or depression of the horse's head between the mandibles of the jaw. With this arrangement, the air passageway, particularly the nasopharynx opening, is kept open for unobstructed breathing. When the horse is stationary, the attachment normally would not be used. Rather, it would be applied upon the horse just before the vigorous exercise. Once the vigorous exercise is concluded, the attachment may be immediately disconnected from the horse's head. Because of the simple construction of the attachment and the simple way in which it is mounted or secured to the horse, the trainer or driver or attending individual may easily attach or remove the attachment quickly with little effort and without using any tools.

Significantly, one of the problems which occurs in instances where no such attachment is used, is that the unwanted lowering of the horse's head against its neck sufficiently loosens the straps which connect to the opposite sides of the bit so that the bit may become loose relative to the corners of the horse's mouth, Then the bit may be clenched between the horse's teeth. When that occurs, the horse is no longer under control of the driver. Hence, the attachment prevents that from happening. This avoids the uses of various types of straps or side poles which have been used in the past n attempts to hold the horse's head straight up.

The foregoing describes an operative embodiment of a preferred mode of the construction and operation of the attachment claimed below. Thus, having fully described at least one operative embodiment, it is desired that the foregoing be read as merely illustrative and in a strictly limiting sense. I now claim:

What is claimed is:

1. A choke prevention attachment for temporary attachment to a horse for locking the position of the horse's head when the horse is running, comprising:

a rigid, thin, plate having a lower portion shaped to overlap and engage against the forward portion of a horse's neck beneath the junction of the horse's head and neck, and an integral upper plate extending at an obtuse angle upwardly and forwardly of the lower plate for fitting beneath, and engaging the horse's jaw;

an elongated, narrow resilient pad is mounted to the upper plate portion in a position to snugly fit into the intermandibulary space of the horse's jaw and extending generally forwardly of the horse's head from the rear of the jaw, from the junction between the horse's jaw and neck, towards the forward portion of the jaw;

manually adjustable straps are connected to the attachment and shaped for firmly fastening the attachment to the horse's head;

whereby the horse's head is temporarily locked in an upper position, preventing downward tilting of the head towards the neck by the horse, and preventing side-to-side movement of the head, for thereby resisting blockage of the nasopharynx, by the dorsal portion of the horse's tongue, while the horse is vigorously moving and breathing heavily.

2. A choke prevention attachment as defined in claim 1, and wherein the lower portion of the plate is formed with a integral, bowed, curved portion and integral side strips on the opposite sides of a central portion, with the central portion being shaped to be normally spaced from the forward edge region of the horse's neck when the attachment is placed upon the horse for overlapping the neck;

whereby the forward portion of the horse's neck may freely expand into said bowed central portion of the attachment at times when the horse is breathing heavily.

3. A choke prevention attachment as defined in claim 1, and whereby the pad is formed of a thick, resilient, rubbery-like material which resiliently compresses when the horse's head is moved into a tilted downward position, to thereby resist the tilting and hold the head in an upwardly, generally locked upward position against downward movement, and simultaneously the pad arranged between the mandibles of the jaw resists side-by-side swinging motion of the horse.

4. A choke prevention attachment as defined in claim 3, and including at least one of said straps being formed with connections for securing to conventional bridle straps positioned upon the horse's head, with a second strap arranged to encircle the forward nose portion of the horse's head.

5. A method for preventing choking by a horse while running, due to temporary blockage of the horse's throat area, the nasopharynx area of the horse's breathing passages, by the dorsal region of the horse's tongue which may occur when the horse's head is tilted downwardly or swung from side-to-side comprising:

providing a choke prevention attachment having a rigid plate and an elongated pad;

temporarily attaching the rigid plate, the rigid plate having a lower member and an integral upper member, upon the horse with the lower member engaged against the horse's neck, just beneath the horse's head, and the upper member engaging beneath and against the horse's jaw area, between the region of the intermandibulary part of the jaw;

snuggly fitting the elongated pad formed on the upper member for extending partially into the intermandibulary region of the horse's jaw with the pad extending from approximately the region below the nasopharynx towards the front region of the jaw;

firmly fastening the upper member against movement relative to the horse's jaw and neck so that the horse's head is prevented from tilting downwardly and from side-to-side while the attachment is secured upon the horse;

whereby, the horse's head is locked against downward tilting movement relative to the horse's neck and from side-to-side movement, when the horse is running or similarly engaged in vigorous exercise.

6. A method as defined in claim 5, and including using the elongated pad formed of a thick, elongated, resilient, material generally shaped to fit within the intermandibulary region of the horse's jaw for snuggly fitting within the region between the jaw mandibles and thereby resisting downward tilting of the horse's head or side-by-side turning of the head.

7. A method as defined in claim 6, and including fastening the attachment to the conventional bridle placed upon the horse's head by manually applied straps arranged at the rear of the horse's head, near the throat and neck portions of the horse.

8. A method as defined in claim 7, and including securing the attachment to the horse with a strap connecting the upper plate of the attachment near the juncture of the lower and upper members of the plate around the rear portion of the horse's head, and a second strap connecting the upper member around generally the middle of the horse's head.

* * * * *